United States Patent
Liu

(10) Patent No.: US 7,852,720 B2
(45) Date of Patent: Dec. 14, 2010

(54) WRITE STRATEGY SETTING APPARATUS UTILIZING SHARED STORAGE UNIT AND METHOD THEREOF

(75) Inventor: Yuan-Chin Liu, Hsinchu (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1077 days.

(21) Appl. No.: 11/421,482

(22) Filed: Jun. 1, 2006

(65) Prior Publication Data

US 2007/0050665 A1  Mar. 1, 2007

Related U.S. Application Data

(60) Provisional application No. 60/712,797, filed on Aug. 31, 2005.

(51) Int. Cl.
 *G11B 7/00* (2006.01)
(52) U.S. Cl. ............... 369/47.53; 369/47.3; 369/47.31; 369/47.22; 369/59.11
(58) Field of Classification Search .............. 369/47.1, 369/47.3, 47.31, 47.22, 30.12
 See application file for complete search history.

(56) References Cited

U.S. PATENT DOCUMENTS

| 6,396,787 | B1 * | 5/2002 | Lee et al. ................. 369/59.18 |
| 6,982,939 | B2 * | 1/2006 | Powelson et al. ........ 369/47.53 |
| 2002/0126604 | A1 * | 9/2002 | Powelson et al. ........ 369/47.53 |

\* cited by examiner

*Primary Examiner*—Wayne R Young
*Assistant Examiner*—Aneeta Yodichkas
(74) *Attorney, Agent, or Firm*—Winston Hsu; Scott Margo

(57) ABSTRACT

A write strategy setting apparatus applied in an optical disc drive includes a storage unit, an error calculator, and a write strategy controller. The storage unit stores an initial write strategy including a plurality of write strategy parameter sets corresponding to a plurality of data set types; the error calculator calculates an error value set for each data set type generated by the optical disc drive utilizing a corresponding write strategy parameter set in the initial write strategy, and stores the calculated error value set into the storage unit to thereby overwrite the write strategy parameter set; and the write strategy controller determines a modified write strategy by referring to a plurality of error value sets stored in the storage unit and the initial write strategy, and then storing the modified write strategy into the storage unit.

19 Claims, 4 Drawing Sheets

| Address 0 | Write strategy parameter set | Data set type 0 |
| Address 1 | Write strategy parameter set | Data set type 1 |
| Address 2 | Write strategy parameter set | Data set type 2 |
| ......... | ......... | ......... |
| Address N | Write strategy parameter set | Data set type N |

(a)

| Address 0 | Phase error value set | Data set type 0 |
| Address 1 | Phase error value set | Data set type 1 |
| Address 2 | Phase error value set | Data set type 2 |
| ......... | ......... | ......... |
| Address N | Phase error value set | Data set type N |

WRITE STRATEGY SETTING APPARATUS UTILIZING SHARED STORAGE UNIT AND METHOD THEREOF

CROSS REFERENCE TO RELATED APPLICATIONS

The application claims the benefit of U.S. Provisional Application No. 60/712,797, which was filed on Aug. 31, 2005 and was entitled "apparatus and method of auto-writing strategy adjustment for optical storage".

BACKGROUND

The present disclosure relates to a setting apparatus and a method for setting write strategy applied in an optical disc drive, and more specifically, to a write strategy setting apparatus and method thereof for sharing the same storage unit to save a plurality of write strategy parameter sets corresponding to a plurality of data set types and an error value set (for example, a phase error value set or a length error value set) for each data set type generated by the optical disc drive utilizing a corresponding write strategy parameter set.

There are many kinds of optical discs available in the market, and for different discs, characteristics and uniformity of coating layers of the discs are different. Therefore, before recording data on an optical disc, the optical disc drive has to generate a write pulse according to a write strategy to drive the laser diode generating laser beam to burn pits on the disc surface (i.e., a data recording layer), and then read the pits and lands on the disc surface to adjust the write strategy to make sure that the data is correctly recorded.

As is well-known to those skilled in this art, the optical disc drive needs a memory block to store a preset write strategy table, and measures different kinds of land-pit sets to generate error values and stores the error values in another memory block. After repeated measurement and calculation, a statistic error value is determined and utilized to adjust the write strategy stored in the memory block. That is, the optical disc drive needs two memory blocks to store the write strategy and the error values individually.

SUMMARY

It is therefore one of the objectives of the claimed disclosure to provide an apparatus and a method for setting write strategy applied in an optical disc drive by utilizing a shared storage unit to save a plurality of write strategy parameter sets corresponding to a plurality of data set types and an error value set for each data set type generated by the optical disc drive utilizing a corresponding write strategy parameter set.

According to the claimed disclosure, a write strategy setting apparatus applied in an optical disc drive is disclosed. The apparatus includes a storage unit for storing an initial write strategy including a plurality of write strategy parameter sets corresponding to a plurality of data set types; an error calculator, coupled to the storage unit, for calculating an error value set for each data set type generated by the optical disc drive utilizing a corresponding write strategy parameter set in the initial write strategy, and storing the calculated error value set into the storage unit to overwrite the write strategy parameter set; and a write strategy controller, coupled to the storage unit, for determining a modified write strategy by referring to a plurality of error value sets stored in the storage unit and the initial write strategy, and then storing the modified write strategy into the storage unit.

According to the claimed disclosure, a write strategy setting method applied in an optical disc drive is disclosed. The method includes: storing an initial write strategy including a plurality of write strategy parameter sets corresponding to a plurality of data set types; calculating an error value set for each data set type generated by the optical disc drive utilizing a corresponding write strategy parameter set in the initial write strategy, and storing the calculated error value set into the storage unit to thereby overwrite the write strategy parameter set; and determining a modified write strategy by referring to a plurality of error value sets stored in the storage unit and the initial write strategy, and then storing the modified write strategy.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a table of the register address in a read mode and a write mode according to an embodiment in the present disclosure.

DETAILED DESCRIPTION

Because an optical disc drive adjusts a write strategy parameter set according to error value set for each data set type generated by the optical disc drive utilizing a corresponding write strategy parameter set, the error value set has to represent the difference between an ideal data pattern and an actual data pattern. There are two physical parameters that can be utilized as the error value. The first physical parameter is a phase error and the second physical parameter is a length error.

Figure 1:
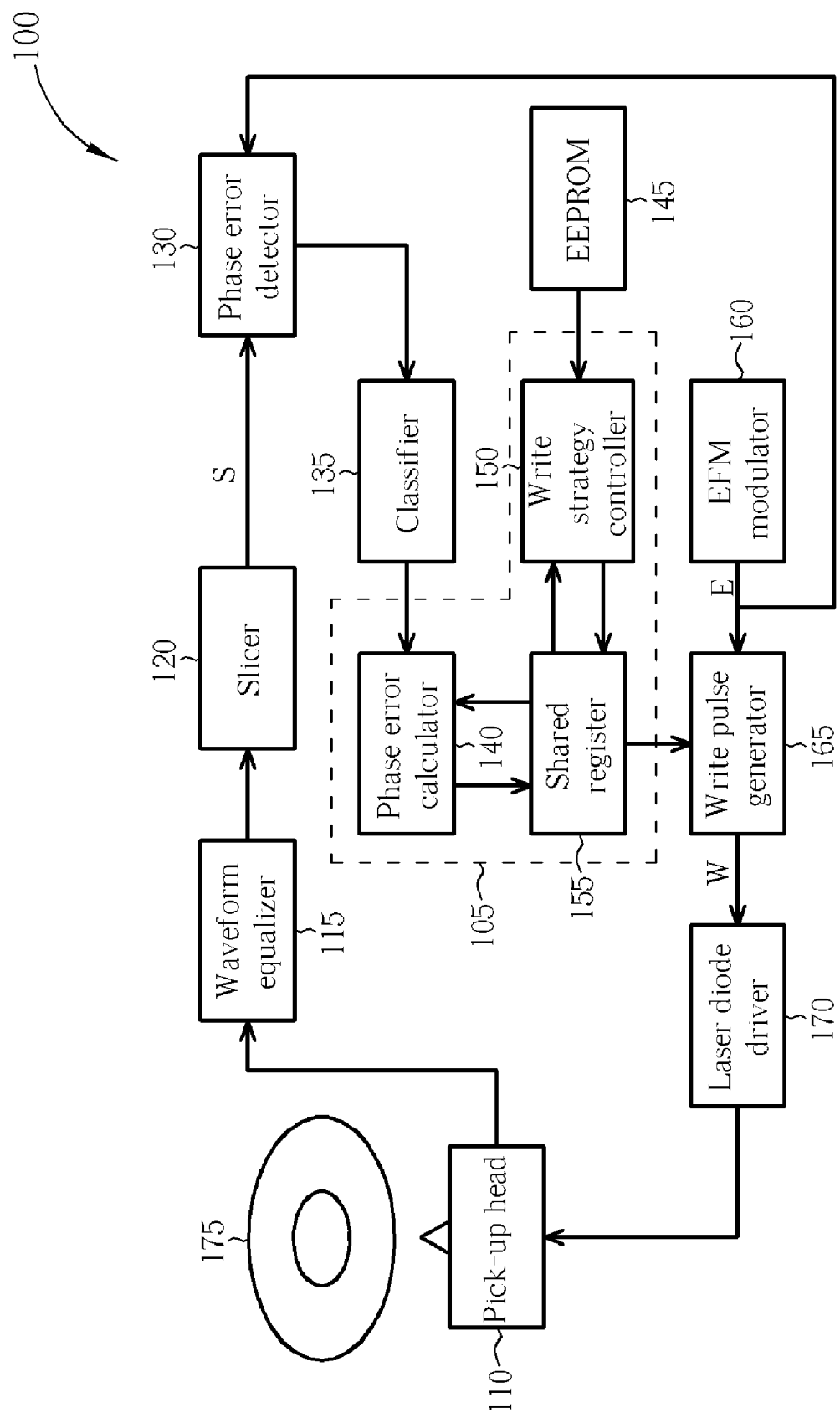
FIG. 1 is a block diagram of a preferred embodiment of a write strategy setting apparatus applied in an optical disc drive according to the present disclosure.
Figure 2:
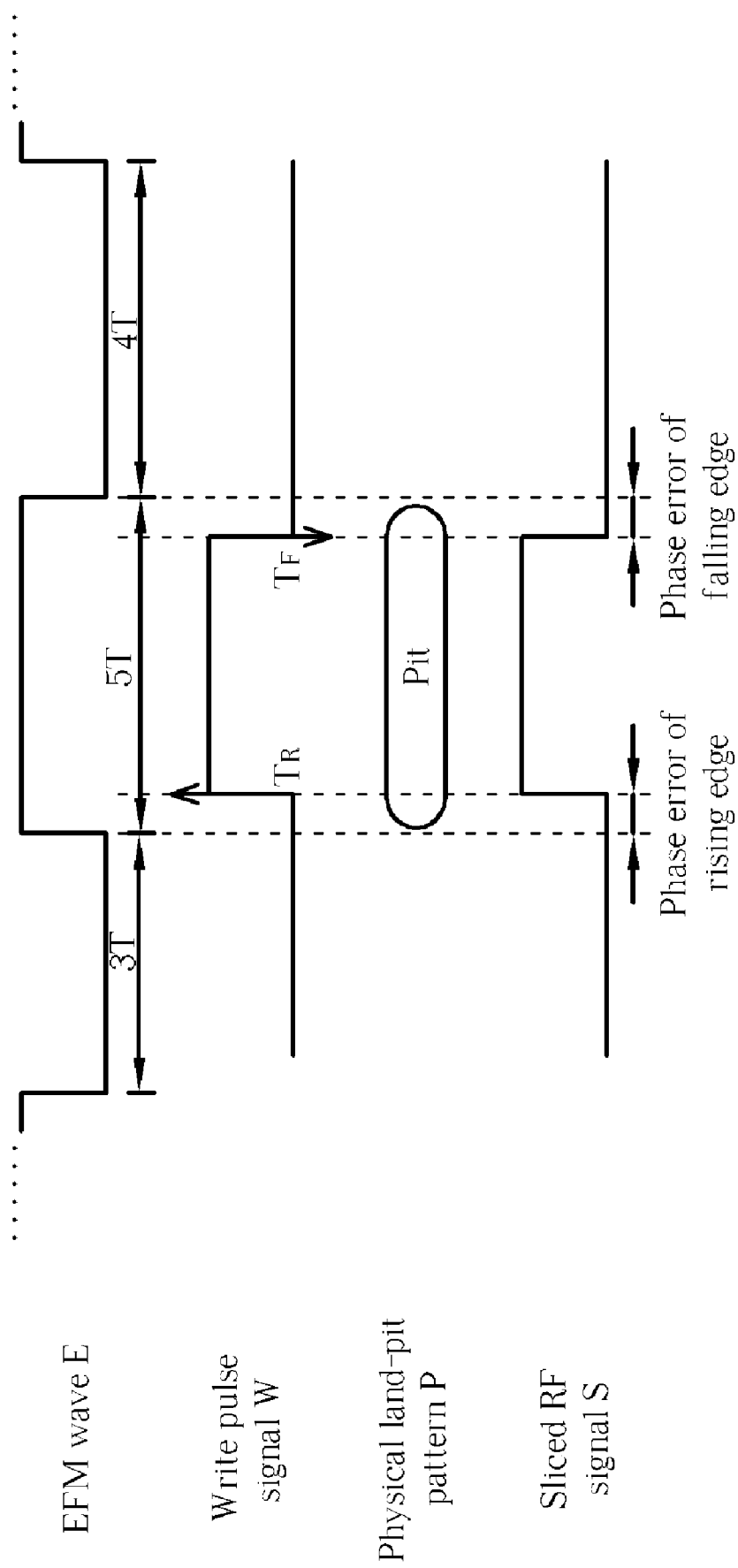
FIG. 2 is a waveform diagram illustrating an eight-to-fourteen modulation (EFM) wave E, a write pulse signal W, a physical land-pit pattern P, and a sliced radio frequency (RF) signal S.

Taking the phase error set as an example, please refer to FIG. 1 and FIG. 2. FIG. 1 is a block diagram of a preferred embodiment of a write strategy setting apparatus 105 applied in an optical disc drive 100 according to the present invention. FIG. 2 is a waveform diagram illustrating an eight-to-fourteen modulation (EFM) wave E, a write pulse signal W, a physical land-pit pattern P, and a sliced radio frequency (RF) signal S. The optical disc drive 100 includes a pick-up head 110, a waveform equalizer 115, a slicer 120, a phase error detector 130, a classifier 135, a phase error calculator 140, an electrically erased programmable read only memory (EEPROM) 145, a write strategy controller 150, a shared register 155, an eight-to-fourteen modulator 160, a write pulse generator 165, and a laser diode driver 170. The phase error calculator 140, the shared register 155, and the write strategy controller 150 are combined to form the write strategy setting apparatus 105. The write strategy parameter set defines the location of the rising edge $T_R$ and the falling edge $T_F$ for a data set type, and the write strategy includes all write strategy parameter sets for all possible data set types. Please refer to FIG. 2, for an example of a different data set type (3T, 5T, 4T), the pit 5T is between two lands 3T and 4T. There are two write strategy parameters, the rising edge $T_R$ and the falling edge $T_F$, to be set. The rising edge $T_R$ represents the timing that the write pulse signal W needs to be triggered in a land-pit pattern (3T,5T) and the falling edge $T_F$ represents the timing that the write pulse signal W needs to be triggered in a pit-land pattern (5T,4T). The write strategy parameters defining the rising edge $T_R$ and the falling edge $T_F$ of the write pulse signal W are stored in the shared register 155 respectively.

Please refer to FIG. 1. At the beginning, the write strategy controller 150 loads an initial write strategy saved in the EEPROM 145 and writes the initial write strategy into the shared register 155. Next, the write pulse generator 165 generates a write pulse signal W corresponding to the EFM wave E generated by the EFM modulator 160 corresponding to data set types, for example, data set type (3T, 5T) shown in FIG. 2, wherein the locations of the rising edge $T_R$ of the write pulse signal W is determined by the write strategy parameter set corresponding to the data set type (3T, 5T) in the initial write strategy. The laser diode driver 170 drives the pick-up head 110 in accordance with the write pulse signal W to burn the physical land-pit pattern P on the surface track of the optical disc 175 to record data. Then the optical disc drive 100 operates in a read mode and the pick-up head 110 reads the physical land-pit pattern P burned on the optical disc 175 to generate a data signal. Through processes of the waveform equalizer 115 and the slicer 120, the data signal is transformed into the sliced RF signal S shown in FIG. 2. In an ideal condition, the waveform of the sliced RF signal S should be the same as the EFM wave E, but for different discs, there exists different phase error between the sliced RF signal S and the EFM wave E. The phase error detector 130 detects phase error of each data set type to generate phase error value sets, wherein a phase error value set includes a rising-edge error value and a falling-edge error value. The classifier 135 then classifies the phase error value sets according to the data set type and transfers the phase error value set to the phase error calculator 140, and the phase error calculator 140 continuously saves the phase error value set at a corresponding address into the shared register 155. Similarly, the falling edge $T_F$ of the data set type (5T, 4T) is determined in the same procedures.

Please refer to FIG. 3. FIG. 3 is a table of the register address in a read mode and a write mode according to an embodiment of the present disclosure. As mentioned above, at the beginning, the initial write strategy is loaded into the shared register 155. Each write strategy parameter set corresponds to a specific data set type and is saved in an address corresponding to the specific data set type. Taking FIG. 3(a) for example, the address 0 corresponds to data set type 0 and the write strategy parameter set for data set type 0 is saved in the address 0; similarly, the write strategy parameter set for data set type 1 is saved in the address 1, etc. When the optical disc drive reads the test physical land-pit pattern P, the phase error calculator 140 saves the phase error value set at a corresponding address for all data set types into the shared register 155 to replace (or overwrite) the write strategy parameter set. Please refer to FIG. 3(b), the write strategy parameter set saved in the address 0 is replaced by the phase error value set corresponding to the data set type 0, that is, the write strategy and the phase error value sets share the same storage unit to save data. The storage unit can be, for example, the shared register 155 shown in FIG. 1. Every time the phase error calculator 140 receives a phase error value corresponding to a specific data set type, the phase error calculator 140 calculates the newly received phase error value with the original phase error value saved in the address for the specific data set type, and overwrites the original phase error value with the calculating result.

After a series of calculations, the shared register 155 stores the final results of the phase error value sets and then the write strategy controller 150 refers to both the final phase error value sets and the initial write strategy parameter sets together to determine a modified write strategy. Finally, the write strategy controller 150 stores the modified write strategy corresponding to data set types at specific addresses to overwrite the phase error value sets stored in the shared register 155. Therefore, when the optical disc drive 100 operates in a write mode, the shared register 155 stores the write strategy parameter sets, and the write pulse generator 165 can generate the correct write pulse signal W according to the modified write strategy. If the rising edge of the sliced RF signal S is later than the rising edge of the EFM wave E as FIG. 2 shows, then the write strategy controller 150 advances the rising edge of the write pulse signal W; conversely, if the rising edge of the sliced RF signal S is earlier than the rising edge of the EFM wave E, then the write strategy controller 150 delays the rising edge of the write pulse signal W. The procedure to adjust the falling edge of the write pulse signal W is executed in a similar fashion, and further description is omitted for brevity.

Please note that, the error value sets are not limited to the phase error value sets. It is possible to detect the length error between an ideal length of the EFM wave E and an actual length of the sliced RF signal S. For different data set type, the ideal length of the EFM wave E is also different, so in the condition for detecting length error, it also has to determine classification according to the data set type. If the actual length of the sliced RF signal S is shorter than the ideal length of the EFM wave E, then the write strategy controller 150 adjusts the strategy parameter set to make sure that the length of the write pulse signal W is increased; conversely, if the actual length of the sliced RF signal S is longer than the ideal length of the EFM wave E, the write strategy controller 150 adjusts the strategy parameter set to make sure that the length of the write pulse signal W is decreased.

Please note that, the EEPROM 145 is utilized to store the initial write strategy table. The EEPROM 145 can be replaced by other kinds of nonvolatile memory, such as a flash memory. The shared register 155 is also not limited as a register set, but it should be a high-speed memory unit for mass data and frequently accesses. Additionally, the shared register 155 can be replaced by a static random access memory (SRAM).

Figure 4:
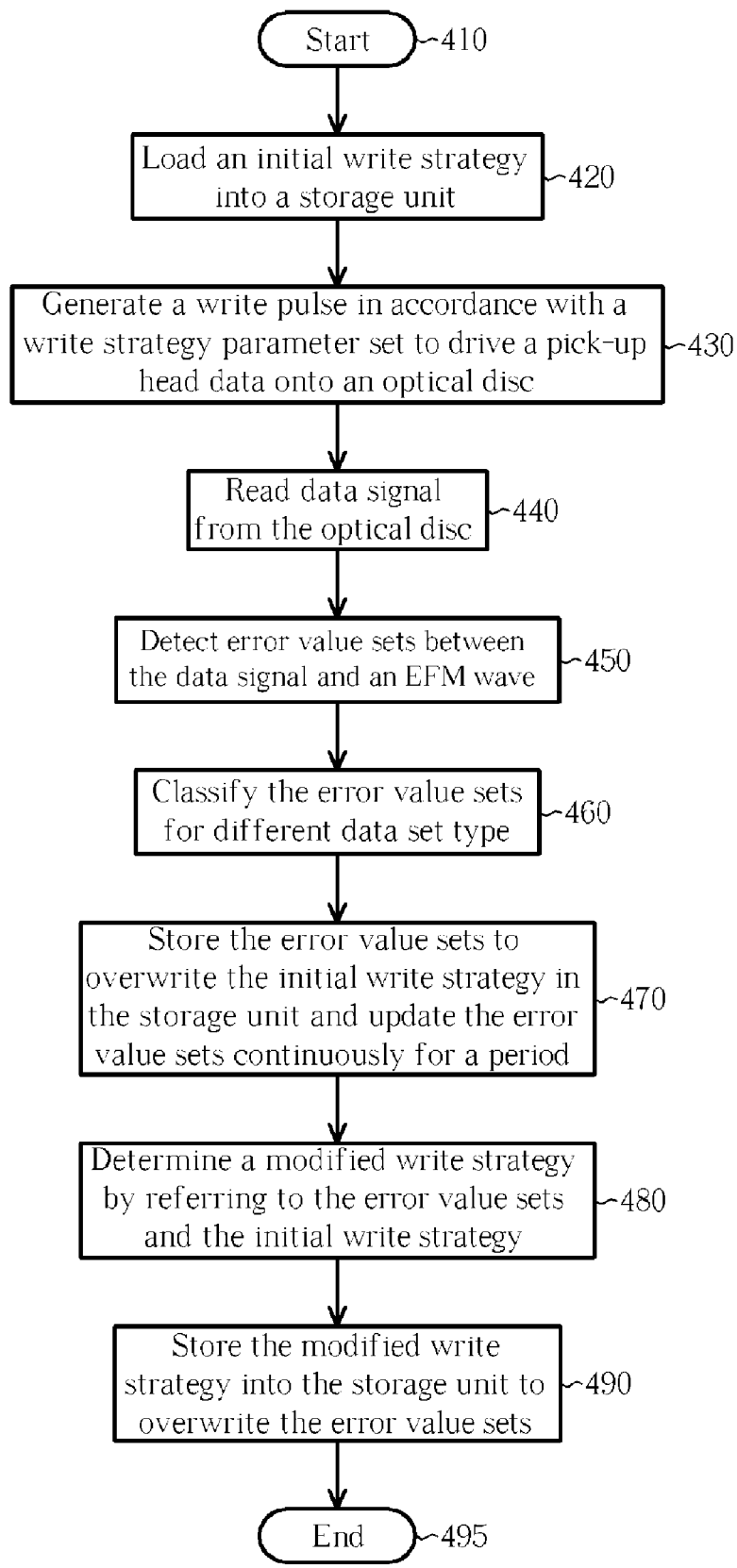
FIG. 4 is a flowchart of a preferred embodiment of a write strategy setting method applied in an optical disc drive according to the present disclosure.

Please refer to FIG. 4. FIG. 4 is a flowchart of a preferred embodiment of a write strategy setting method applied in an optical disc drive according to the present disclosure. Detailed steps are described below:

Step 410: start;

Step 420: load an initial write strategy including a plurality of write strategy parameter sets corresponding to a plurality of data set types and save the initial write strategy into a storage unit;

Step 430: generate a write pulse according to a write strategy parameter set to drive a pick-up head to burn data onto an optical disc;

Step 440: read a data signal corresponding to the write pulse signal from the optical disc;

Step 450: detect error value sets between the data signal and an EFM wave;

Step 460: classify each error value set into a specific data type set;

Step 470: store the error value sets to overwrite the initial write strategy in the storage unit and update the error value sets continuously for a period;

Step 480: determine a modified write strategy by referring to the error value sets and the initial write strategy;

Step 490: store the modified write strategy into the storage unit to overwrite the error value sets;

Step 495: end.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A write strategy setting apparatus applied in an optical disc drive, comprising:
    a storage unit for initially storing an initial write strategy including a plurality of write strategy parameter sets respectively corresponding to a plurality of data set types;
    an error calculator, calculating an error value set of each data set type generated by the optical disc drive, utilizing a corresponding write strategy parameter set in the initial write strategy, and storing the calculated error value set into the storage unit to thereby overwrite the corresponding write strategy parameter set, wherein the write strategy parameter sets of the initial write strategy stored in the storage unit are overwritten by a plurality of error value sets of the data set types, respectively; and each of the error value sets is not a write strategy parameter set; and
    a write strategy controller, determining a modified write strategy by referring to the error value sets stored in the storage unit and the initial write strategy, and then storing the modified write strategy into the storage unit.

2. The write strategy setting apparatus of claim 1, wherein the optical disc drive refers to the corresponding write strategy parameter set in the initial write strategy to generate a write pulse signal utilized for testing the corresponding data set type, and then reads a data signal corresponding to the write pulse signal; and the error calculator refers to phase errors between the data signal and the write pulse signal to determine the error value set.

3. The write strategy setting apparatus of claim 2, wherein the data signal is a sliced RF signal.

4. The write strategy setting apparatus of claim 1, wherein the error value set includes a length error between an ideal length of an eight-to-fourteen modulation (EFM) wave and an actual length of a sliced RF signal generated by the optical disc drive.

5. The write strategy setting apparatus of claim 1, wherein the optical disc drive refers to write strategy parameter sets in the initial write strategy to generate a write pulse signal utilized for testing data set types, and then reads a data signal corresponding to the write pulse signal, and the write strategy setting apparatus further comprises:
    an error detector for detecting the data signal to determine a plurality of error values; and
    a classifier, coupled to the error detector and the error calculator, for classifying each error value into a specific data type set;
    wherein the error calculator determines the error value sets according to the classified error value outputted from the classifier.

6. The write strategy setting apparatus of claim 1, further comprising a nonvolatile memory to store the initial write strategy, wherein the write strategy controller loads the initial write strategy from the nonvolatile memory and writes the initial write strategy into the storage unit.

7. The write strategy setting apparatus of claim 1, wherein the error calculator overwrites the corresponding write strategy parameter set utilizing the calculated error value set when the optical disc drive operates in a read mode; and the write strategy controller stores the modified write strategy when the optical disc drive operates in a write mode.

8. The write strategy setting apparatus of claim 1, wherein the storage unit is a register set.

9. The write strategy setting apparatus of claim 1, wherein the storage unit is an SRAM.

10. The write strategy setting apparatus of claim 1, wherein when receiving an error value set of a specific data set type under a condition where an original error value set of the specific data set type is stored in the storage unit, the error calculator calculates a new error value set of the specific data set type and overwrites the original error value set stored in the storage unit by the new error value set.

11. A write strategy setting method applied in an optical disc drive, comprising:
    storing an initial write strategy including a plurality of write strategy parameter sets respectively corresponding to a plurality of data set types;
    calculating an error value set for each data set type generated by the optical disc drive, utilizing a corresponding write strategy parameter set in the initial write strategy, and storing the calculated error value set into a storage unit to thereby overwrite the corresponding write strategy parameter set, wherein the write strategy parameter sets of the initial write strategy stored in the storage unit are overwritten by a plurality of error value sets of the data set types, respectively; and each of the error value sets is not a write strategy parameter set; and
    determining a modified write strategy by referring to the error value sets stored in the storage unit and the initial write strategy, and then storing the modified write strategy.

12. The write strategy setting method of claim 11, further comprising:
    referring to the corresponding write strategy parameter set in the initial write strategy to generate a write pulse signal utilized for testing the corresponding data set type;
    reading a data signal corresponding to the write pulse signal; and
    referring to phase errors between the data signal and the write pulse signal to determine the error value set.

13. The write strategy setting method of claim 12, wherein the data signal is a sliced RF signal.

14. The write strategy setting method of claim 11, wherein the error value set includes a length error between an ideal length of an eight-to-fourteen wave and an actual length of a sliced RF signal generated by the optical disc drive.

15. The write strategy setting method of claim 11, wherein the optical disc drive refers to write strategy parameter sets in the initial write strategy to generate a write pulse signal utilized for testing data set types, and then reads a data signal corresponding to the write pulse signal, and the write strategy setting method further comprises:
    detecting the data signal to determine a plurality of error values; and
    classifying each error value into a specific data type set;
    wherein the step of calculating the error value sets is in accordance with the classified error value.

16. The write strategy setting method of claim 11, wherein the step of overwriting the corresponding write strategy parameter set by the calculated error value set is executed when the optical disc drive operates in a read mode; and the step of storing the modified write strategy is executed when the optical disc drive operates in a write mode.

17. The write strategy setting apparatus of claim 1, wherein the write strategy controller overwrites the calculated error value set stored in the storage unit by the modified write strategy.

18. The write strategy setting method of claim 11, wherein the step of storing the modified write strategy comprises:
 overwriting the calculated error value set stored in the storage unit by the modified write strategy.

19. The write strategy setting method of claim 11, wherein the step of storing the calculated error value set into the storage unit to thereby overwrite the corresponding write strategy parameter set comprises:
 when receiving an error value set of a specific data set type under a condition where an original error value set of the specific data set type is stored in the storage unit, calculating a new error value set of the specific data set type and overwriting the original error value set stored in the storage unit by the new error value set.

* * * * *